Figure 1:
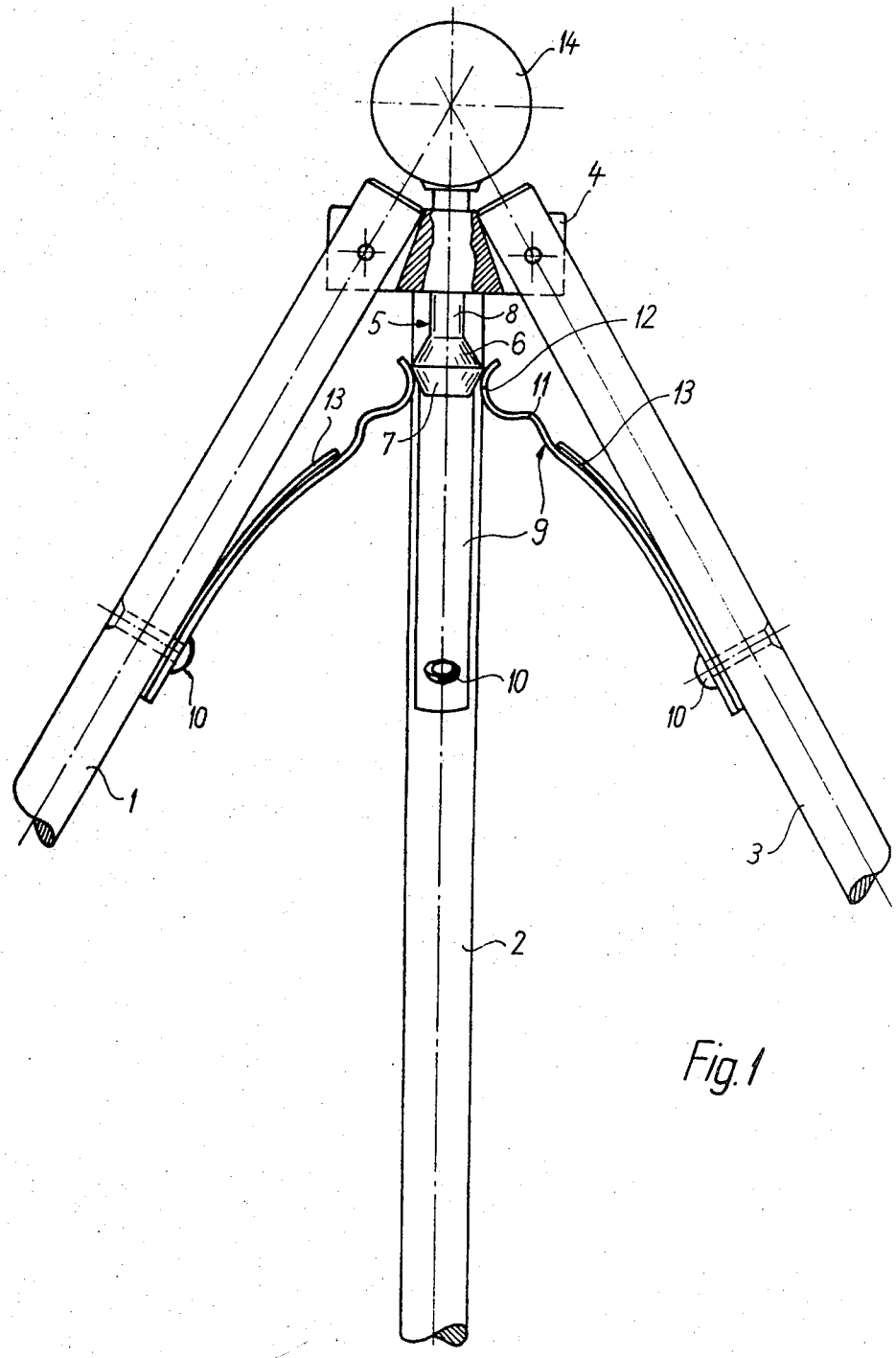

United States Patent
Butz

[11] 3,716,211
[45] Feb. 13, 1973

[54] FOLDABLE STAND
[76] Inventor: Josef Butz, Muhletsbelstrasse 20, Rorschach, Switzerland
[22] Filed: Feb. 11, 1971
[21] Appl. No.: 114,489

[30] Foreign Application Priority Data

Feb. 12, 1970 Switzerland....................2033/70

[52] U.S. Cl.................................................248/168
[51] Int. Cl............................................F16m 11/38
[58] Field of Search..........248/46, 96, 168, 169, 170, 248/171

[56] References Cited

UNITED STATES PATENTS

| | | | |
|---|---|---|---|
| 507,178 | 10/1893 | Smith | 248/170 |
| 996,524 | 6/1911 | Raudabaugh | 248/169 X |
| 1,593,415 | 7/1926 | Perkins | 248/170 |
| 2,875,972 | 3/1959 | Shaw et al. | 248/168 |
| 3,257,091 | 6/1966 | Muller | 248/169 |

FOREIGN PATENTS OR APPLICATIONS

| | | | |
|---|---|---|---|
| 93,491 | 10/1896 | Germany | 248/170 |

*Primary Examiner*—William H. Schultz
*Attorney*—Watson, Cole, Grindle & Watson

[57] ABSTRACT

A foldable stand having a head member and at least three legs pivotally connected to the head member so that the legs can be spread from each other in a position of use and adjacent to each other for a position of non-use. The head member has a central rotary member secured to and depending therefrom and a plurality of blade springs are provided secured to each leg at one end and the other end pressing in contact with the head member.

2 Claims, 2 Drawing Figures

PATENTED FEB 13 1973

3,716,211

SHEET 2 OF 2

INVENTOR.
Josef Butz
BY
Watson, Cole, Grindle & Watson
Attys.

FOLDABLE STAND

The invention relates to a foldable stand with at least three legs pivotally connected to a head member so that the legs can be spread from each other in a position of use and adjacent to each other for a position of non-use.

As to stands known heretofore, the legs are held in spread-apart position by spring force and can be folded together by force counter to the spring or springs. In this position they can be shoved into a protecting casing so that the stand in non-use can be stored in a small space. By such structures, for example, each leg is connected at the upper end with one end of a spiral spring, whereas the other end of the spring is connected to a head piece, so that the springs will hold the legs in spread-apart position and with bent springs enable the legs to be folded together so that the stand can be stored.

In another known structure, a stand is provided in which the legs are pivoted to a head piece which is connected to the upper end of a central guide pipe and each leg is pivoted to a lever which is pivotally connected with a slidable part on the guide pipe whereby a spring around the guide pipe has one end secured against the head piece and the other end abutting against the slidable part in order to hold the leg in its spread-apart position.

It is an object of this invention to simplify the stand in order that it shall in addition hold the legs of the stand as well in its spread position as also in its folded together position held by spring pressure. This is attained in the stand according to the invention by having a central member secured in and depending from the head member and having a plurality of circumferential surface zones, and a plurality of blade springs each secured at one end to a leg and the other end pressing in contact with the circumferential surface zones so that in one position of the legs the blade springs will hold the legs apart in the position of use of the stand and in another position the springs will hold the legs adjacent to each other to position the stand in non-use. In this way due to the spring action against the rotary body, each spring not only is pressed against the central member in its unfolded position of the legs but also in the folded position.

Figure 2:
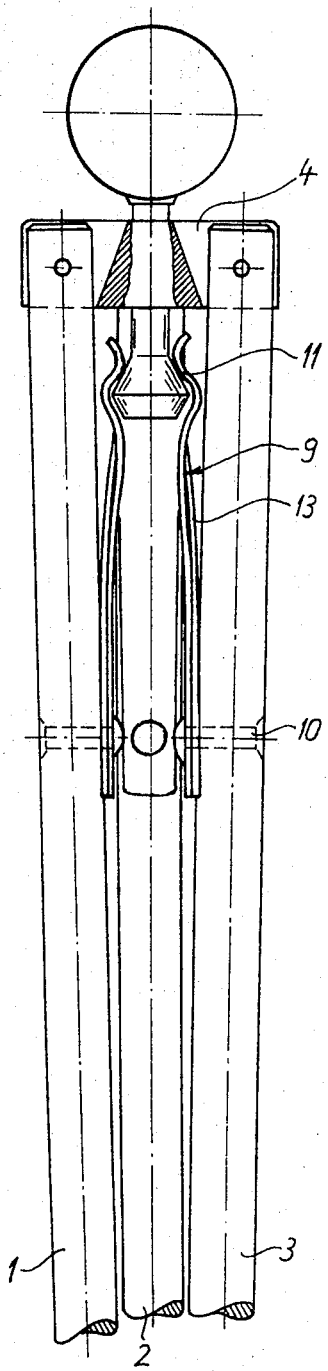

Further objects will be apparent from the following description when considered in connection with the accompanying drawing in which:

FIG. 1 is a side view partly in section of the stand in open position ready for use; and FIG. 2 is a side view similar to FIG. 1 with the stand in folded position.

The stand according to FIGS. 1 and 2 of the drawing shows three legs 1, 2 and 3 hingedly connected. The legs are circumferentially equally connected and divided, that is they are concentrically mounted with an angle of 120° between each two legs connected to a head member 4 at the upper ends. The head member 4 is provided with a downwardly extending member 5 securely depending from the head member and coaxial with the stand's middle axis. The member 5 consists of a double ball member with blunt or obtuse sections in the form of a double conical formed surface from its largest diametrical plane projecting from both directions as to the central plane as conical surfaces 6 and 7 and with a cylindrical part 8 projecting from the conical surface 6, the part 8 having the head member secured thereto.

On the inner side of each leg as to the rotary body there is secured at an end a leaf spring 9 which is fastened by means of a pin or rivet 10 and at the other end is bent in a plurality of wave forms one continuing from the next. The two conical surfaces or sections 6 and 7 of the double cone on the end of the member 5 form the rest surfaces for the wave formed spring blades 9 and are actually such that when the legs are folded as in FIG. 2 of the drawing, the section 11 of the springs are resting against the upper cone surface 6. In the open or unfolded position of the legs, as in use, the ends of the springs as at curved section 12 will contact and rest against the lower conical surface 7 and actually somewhat below the largest diameter plane as shown in FIG. 1. Since the blade springs, due to their forces in the position of use, are in contact with the rotary body somewhat below the greatest diametrical plane of the rotation body, each leg is fixed in the position as shown in FIG. 1. On the other hand, the three legs cannot swing outwardly unintentionally from the position of FIG. 2, since the section 11 of the springs in FIG. 2 contact the conical surface 6 and thus the legs remain in a folded position, and these legs 1, 2 and 3 can only swing outwardly as in FIG. 1 when the spring forces are exceeded. In order to strengthen the contact force of each spring, a short additional spring 13 can be utilized for each leg between the spring and its leg. This additional spring 13 extends almost to the wave section 11 and each spring 13 is secured to its rivet 10 which latter also secures the spring 9.

On the head member 4 there can be mounted a ball member or a ring 14 to serve as a carrying means and to facilitate the setting up of the stand. The length of the legs can be any dimension as desired and as to the drawings foot members have not been shown since they can comprise any desired design and size.

The described stand can be used for various purposes, as for example to support portable street direction signals and signs. Also the stand can be used to support optical instruments, cameras and telescopes as well as a variety of objects and devices. Also the legs can comprise telescoping parts so that the stand can be adjusted for height and inclination. Actually the stand can be used for a large variety of objects and devices.

I claim:

1. A foldable stand comprising a head member, at least three legs pivotally connected to said head member to permit said legs to be spread from each other into a position of use and adjacent to each other into a position of non-use, a central member secured to said head member and depending therefrom, said central member having a two adjacent conical surfaces along the length thereof, the first of said surfaces converging downwardly and the second of said surfaces converging upwardly, and a blade spring secured at one end to each of said legs with the other end of each said spring being bent away from said central member, a portion of each said spring adjacent said bent end having a profile which is curved toward its associated leg, each said spring so arranged that its bent end presses against said first conical surface when said legs are in a position of use thereby serving to hold said legs spread apart, and each said spring being also arranged that a portion of its curved profile presses against said second surface when said legs are in a position of non-use thereby serving to hold said legs adjacent one another.

2. A foldable stand according to claim 1 in which an additional blade spring is secured on each said blade spring at said one end to thereby provide additional spring force for each said spring.

* * * * *